United States Patent [19]

Chari et al.

[11] 4,428,046

[45] Jan. 24, 1984

[54] DATA PROCESSING SYSTEM HAVING A STAR COUPLER WITH CONTENTION CIRCUITRY

[75] Inventors: Venu Chari, San Diego; Jack R. Duke, San Marcos; Shimon Gersten, San Diego, all of Calif.

[73] Assignee: NCR Corporation, Dayton, Ohio

[21] Appl. No.: 146,805

[22] Filed: May 5, 1980

[51] Int. Cl.³ .......................................... G06F 15/16
[52] U.S. Cl. .............................. 364/200; 340/825.19
[58] Field of Search ............ 370/80, 85, 82; 371/34; 364/200 MS File, 900 MS File; 340/825.19, 825.5, 825.51, 825.03; 455/612, 606, 607; 324/96; 350/96.15, 96.16, 96.1, 96.2, 96.3, 96.23; 358/901

[56] References Cited

U.S. PATENT DOCUMENTS

| | | | |
|---|---|---|---|
| 3,706,974 | 12/1972 | Patrick et al. | 364/200 |
| 3,794,983 | 2/1974 | Sahin | 340/146.3 MA |
| 3,919,693 | 11/1975 | Anderson | 364/200 |
| 3,995,258 | 11/1976 | Barlow | 371/34 |
| 4,047,246 | 9/1977 | Kerllenevich | 364/200 |
| 4,067,058 | 1/1978 | Derchak | 364/200 |
| 4,070,648 | 1/1978 | Mergenthaler | 371/34 |
| 4,161,719 | 7/1979 | Parikh et al. | 370/82 |
| 4,189,766 | 2/1980 | Horiguchi | 340/825.5 |
| 4,234,968 | 11/1980 | Singh | 455/607 |
| 4,234,969 | 11/1980 | Singh | 455/607 |
| 4,249,093 | 2/1981 | Henig | 340/825.5 |
| 4,262,357 | 4/1981 | Shima | 340/825.5 |
| 4,281,380 | 7/1981 | DeMesa | 364/200 |
| 4,281,381 | 7/1981 | Ahuja | 364/200 |

Primary Examiner—James D. Thomas
Assistant Examiner—David Y. Eng
Attorney, Agent, or Firm—Stephen F. Jewett; Robert L. Clark

[57] ABSTRACT

A data processing system having a plurality of subsystems linked by a star coupler. The star coupler includes contention circuitry for controlling the star coupler so that at any given time no more than one selected subsystem can pass a message through the star coupler. The contention circuitry uses a conventional priority encode circuit to determine the selected one of the subsystems, so that the first message to be received from one of the subsystems is the message passed or, if two or more messages are received from subsystems simultaneously, the message from the subsystem having the highest relative priority established by the priority encode circuit is the message passed. In an embodiment showing an expanded star coupler, the contention circuitry has plural first level contention circuits and a second level contention circuit, each using a conventional priority encode circuit.

4 Claims, 10 Drawing Figures

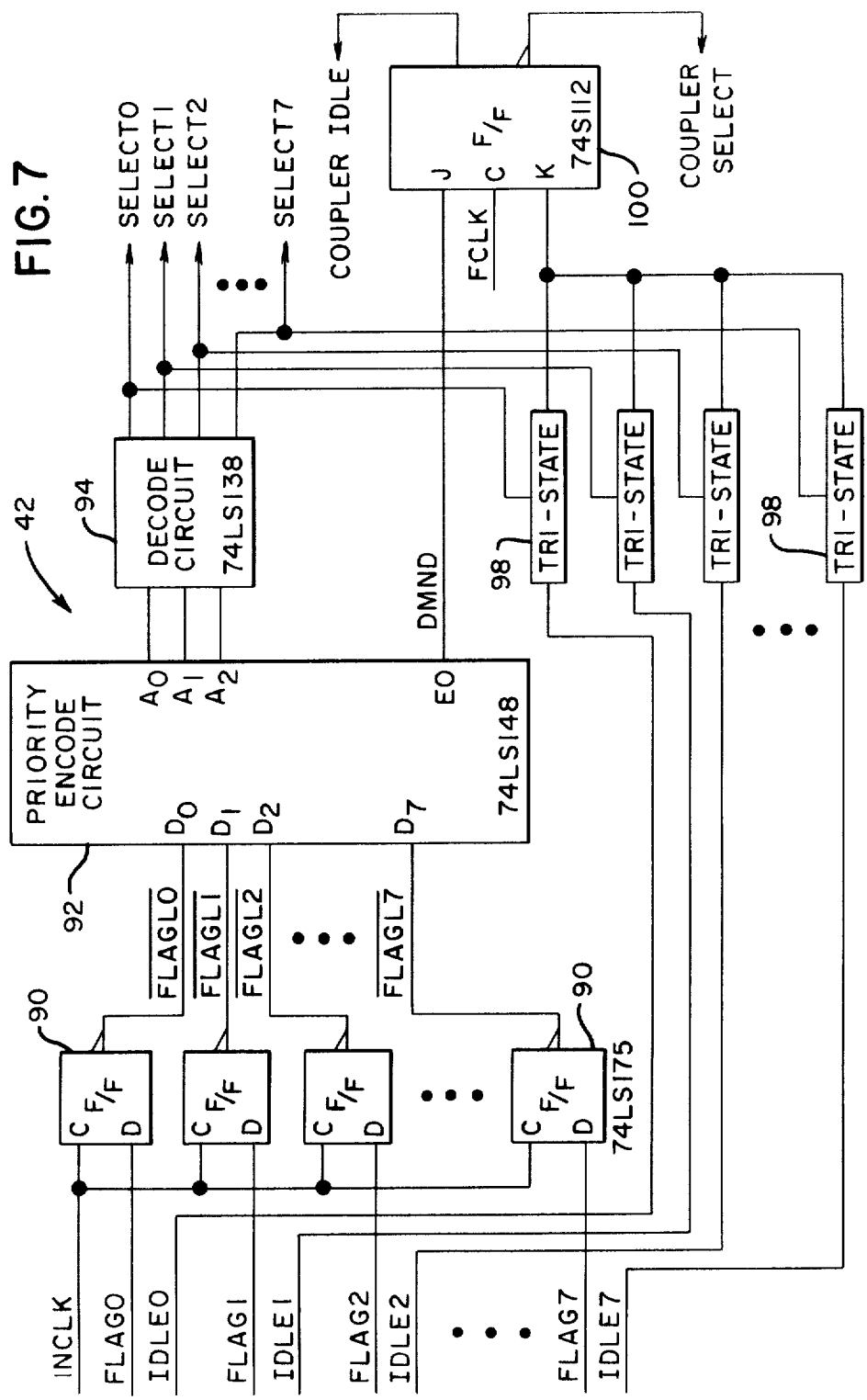

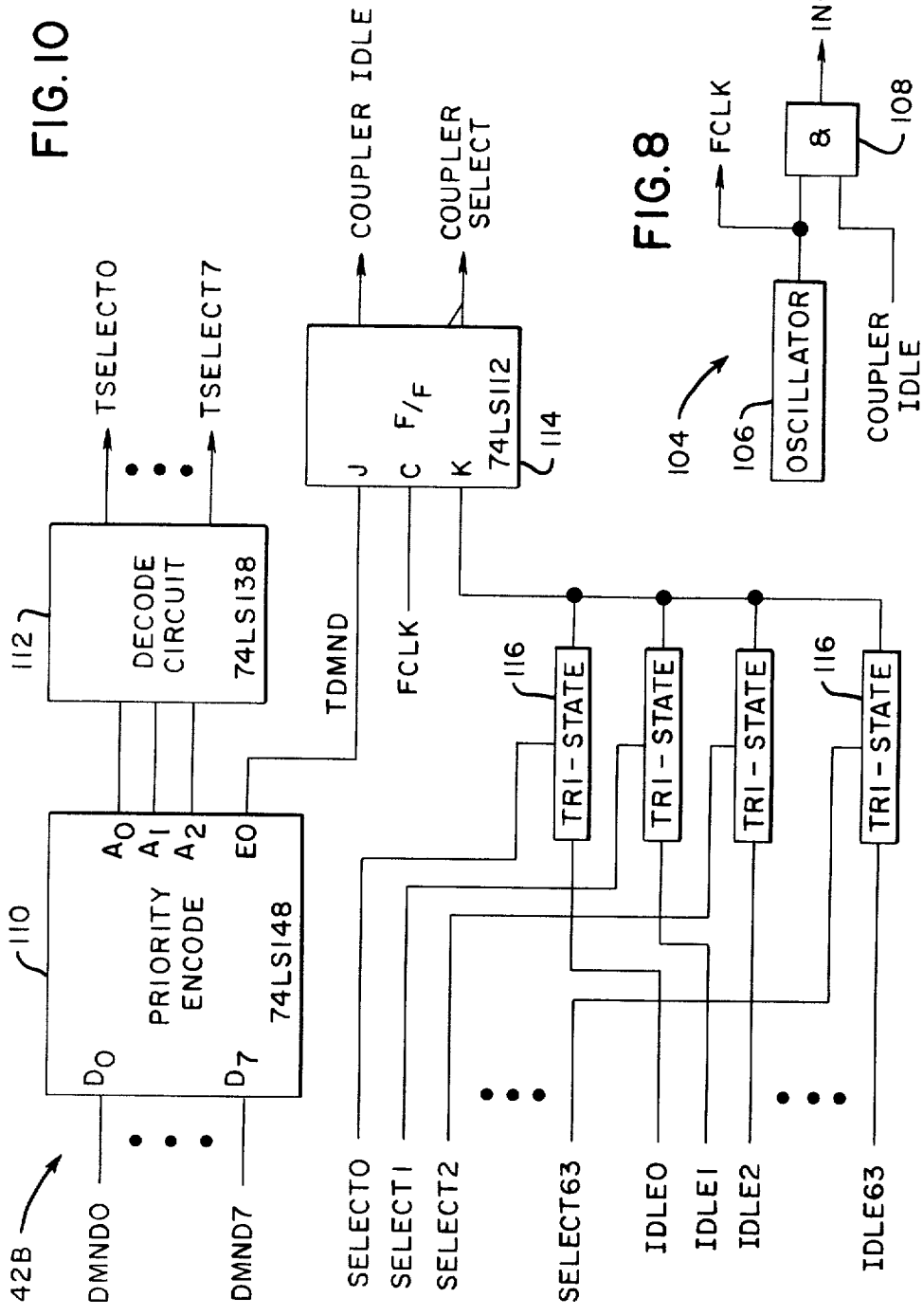
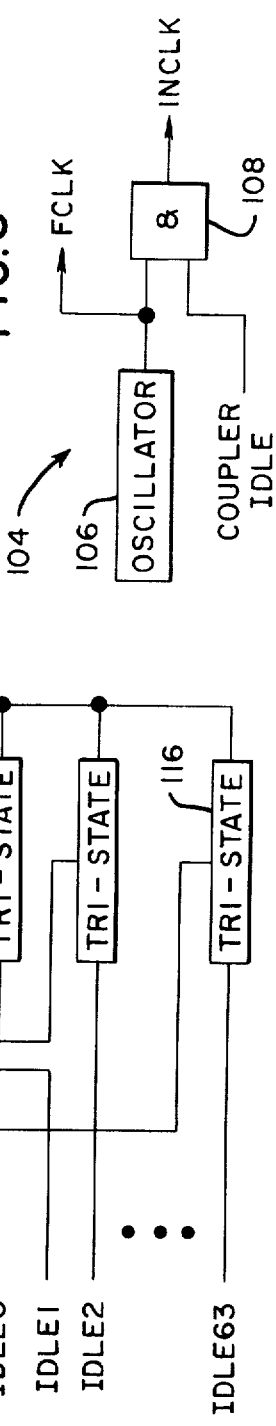

DATA PROCESSING SYSTEM HAVING A STAR COUPLER WITH CONTENTION CIRCUITRY

BACKGROUND OF THE INVENTION

The present invention relates to data processing systems and, more particularly, to data processing systems of the type having a plurality of subsystems linked by a star coupler.

Star couplers are known in the art. Systems employing star couplers or couplers similar to star couplers are described, for example, in the following publications:

Hudson and Thiel, *The Star Coupler: A Unique Interconnection Component for Multimode Optical Waveguide Communications Systems*, 13 Applied Optics 2450 (November, 1974);

Metcalfe and Boggs, *Ethernet: Distributed Packet Switching for Local Computer Networks*, 19 Comm. of the ACM 395 (July, 1976);

Rawson and Metcalfe, *Fibernet: Multimode Optical Fibers for Local Computer Networks*, 26 IEEE Trans. on Comm. 983 (July, 1978).

When used in a data processing system having a plurality of subsystems, a star coupler is typically connected to pairs of transmission lines, with one pair associated with each subsystem and wherein a first transmission line of the pair carries signals away from the subsystem and a second transmission line of the pair carries signals to the subsystem. When any subsystem transmits or generates a signal or message, that message is received by the star coupler from the first transmission line associated with the subsystem and, in turn, is directed or passed to every subsystem by way of each second transmission line, including the second transmission line returning to the subsystem that transmitted the message. This, of course, offers advantages in linking multiple subsystems, since a subsystem transmitting a message receives back the message at the same time that each of the other subsystems receives the message. The transmitting system can check for any transmission errors, without requiring a receiving subsystem to regenerate the message.

There are, of course, problems encountered in a system using a star coupler if two subsystems should transmit simultaneously or nearly simultaneously. In such a case, the signal received by each subsystem is garbled or distorted because of the superimposition of one message on another. Requiring a retransmission in order to correct the problem slows down the operations that are being carried out in the system, since the subsystems having the messages garbled must use processing time later in order to retransmit the messages.

SUMMARY OF THE INVENTION

There is provided, in accordance with the present invention, a data processing system having a plurality of subsystems and a star coupler linking or connecting those subsystems. The star coupler includes contention circuitry for controlling the star coupler so that only one message is passed at any given time through the star coupler.

More specifically, there is provided by the present invention a data processing system wherein each subsystem generates messages preceded by flag bits. Detection circuitry in the star coupler detects the flag bits and the contention circuitry controls the passage of messages through the star coupler so that only the message from the first subsystem generating flag bits is passed through the star coupler. If two messages should occur exactly simultaneously, i.e., begin generating flag bits during the same clock cycle of the system, the one of the two messages having a greater priority, as determined by an order of priority established in the star coupler, is the only message passed through the star coupler.

In the disclosed data processing systems, there is provided a star coupler that includes a flag detection circuit associated with each subsystem. Each flat detection circuit senses the presence or absence of the flag bits in the signal from its associated subsystem, and generates a flag signal that indicates when there are flag bits. Contention circuitry receives the flag signal from each flag detection circuit and, in response, controls gate means, in the form of tri-state devices, that operatively connects the first transmssion line coming from the transmitting subsystem to the second transmission line going to every subsystem, including the transmitting subsystem. The contention circuitry also receives an idle signal from each flag detection circuit that indicates when the associated subsystem is in an idle condition, and controls the tri-state devices so that the first transmission line from each subsystem is connected only to the second transmission line returning to that same subsystem. During the idle condition, each subsystem is generating a steady or repetitive stream of logic level "1" bits so that noise and other spurious signals which might be unintentionally generated along the transmission lines are not mistaken for data bits.

It is therefore an object of the present invention to provide an improved data processing system.

It is still another object of the present invention to provide a data processing system having plural subsystems linked by a star coupler, with the star coupler having circuitry for resolving contention among messages arriving at the star coupler from different subsystems.

It is another object of the present invention to prevent subsystems linked by a star coupler from receiving a garbled signal resulting from two messages being passed through the star coupler at the same time.

These and other objects of the present invention will become more apparent when taken in conjunction with the following description and the attached drawings.

BRIEF DESCRIPTION OF THE DRAWINGS

FIG. 7 is a detailed block diagram illustrating the circuit components within the contention circuitry of the star coupler shown in FIG. 3.

FIG. 8 is a block diagram illustrating the circuitry for generating clock signals for the contention circuitry of FIG. 7.

FIG. 10 is a detailed block diagram illustrating the circuit components within the second level contention circuit shown in FIG. 9.

DESCRIPTION OF THE PREFERRED EMBODIMENT

Figure 1:
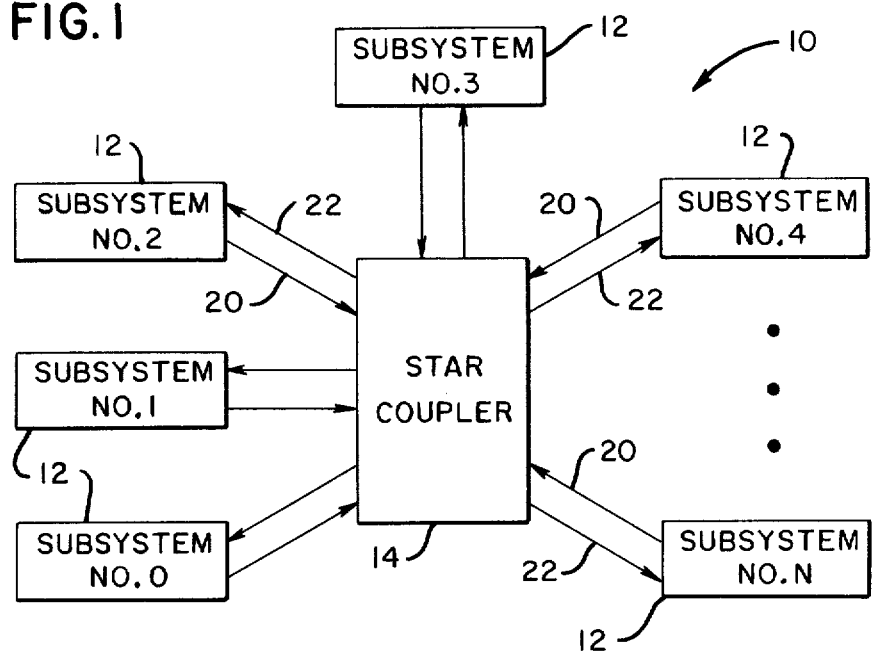
FIG. 1 is a simplified block diagram illustrating a data processing system having plural subsystems linked by a star coupler in accordance with the present invention.

Referring now to FIG. 1, there is shown in general form a data processing system 10 having a plurality of subsystems 12 linked by a star coupler 14 in accordance with the present invention. The subsystems 12 are numbered "0" through "N," and each has an associated pair of transmission lines comprised of a first serial transmission line 20 and a second serial transmission line 11. Each transmission line 20 carries a serial signal or message generated by its associated subsystem 12 to the star coupler 14, and each transmission line 22 carries a serial signal or message from the star coupler 14 back to its associated subsystem. As will be more fully described later, any message that is transmitted and carried along one of the transmission lines 20 from a subsystem is received by the star coupler and may be passed to each transmission line 22 going to every subsystem 12 in the system 10, including the subsystem that transmitted the message.

Figure 2:
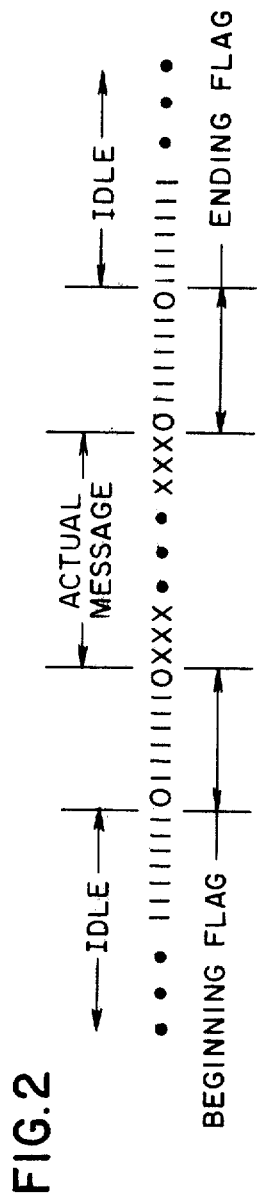
FIG. 2 illustrates an exemplary format of the signals transmitted by each of the subsystems shown in FIG. 1.

In FIG. 2 there is shown the format of the signals that are generated by each of the subsystems 12. As can be seen, when a subsystem is not generating or sending a particular message to another subsystem, the subsystem and its transmission lines are in an idle condition and the subsystem is generating pulses that represent a series of binary "1's."0 When all of the subsystems are in the idle condition, the star coupler 14 operatively connects, in a manner to be described later, the first transmission line 20 of each subsystem to the second transmission line 22 of the same subsystem, so that the series of "1's" from each subsystem is returned to that subsystem. As a result, noise or other spurious signals that may be generated along the transmission lines 20 and 22 are not taken by a receiving subsystem as valid data.

When a message is to be generated and sent from one subsystem to another subsystem, the sending subsystem goes to an active condition and first generates beginning flat bits. In the illustrated format of FIG. 2, these beginning flag bits are eight bits, consisting of six "1's" both preceded by a "0" and followed by a "0." Of course, within the scope of the present invention, any combination of "0's" and "1's" could be chosen to represent the flag bits, as long as the chosen flag bits are permissible under the protocol used in transmitting the message. In the illustrated system 10, data codes are governed by a conventional protocol in which no more than five consecutive "1's" will appear in succession when representing data, so that the specific pattern of flag bits shown in FIG. 2 (six consecutive "1's") is unique and will not otherwise appear except when representing the flag bits. As will be described in greater detail later with reference to FIG. 3, the beginning flag bits illustrated in FIG. 2 are decoded within the star coupler 14 and cause the star coupler 14 to operatively connect the first transmission line 20 from the subsystem generating the message to each second transmission line 22 going to every subsystem in the system 10. After the beginning flag bits, the actual message that is to be sent to another subsystem is generated, which can consist of any combination of "1's" and "0's" representing data, commands, or other information that is needed to be transmitted from one subsystem to another. It would normally be expected that the message would include an address that, when received by each of the subsystems, is recognized by one of those subsystems so that it can act or respond in accordance with the message.

At the end of the message, there is, as illustrated in FIG. 2, a set of ending flag bits. As should become apparent as the present description progresses, the ending flag bits are not used by the star coupler. Rather, the ending flag bits and other flag bits in the message (not shown) are only part of the protocol used by each subsystem for establishing the beginning and end of each message. As will be more fully described later, the star coupler will end the connection previously resulting from the beginning flag bits from a subsystem when it receives a series of 1's from that subsystem indicating an idle condition.

While the actual message format is not critical in the practice of the present invention, the existence of the format, and specifically the beginning flag bits, is important since the star coupler must sense when it is about to receive a message. When the star coupler senses the beginning flag bits, it will, in addition to operatively connecting the first transmission line sending those flag bits to every second transmission line, prevent any message subsequently coming from any other first transmission line from also being directed to the subsystems. Furthermore, and as will be more fully described later, if two of the subsystems 12 should begin to generate flag bits at the same time, i.e., during the same clock cycle, the star coupler 14 will only pass the message from the subsystem which has a higher priority in accordance with a "programmed" priority scheme.

Figure 3:
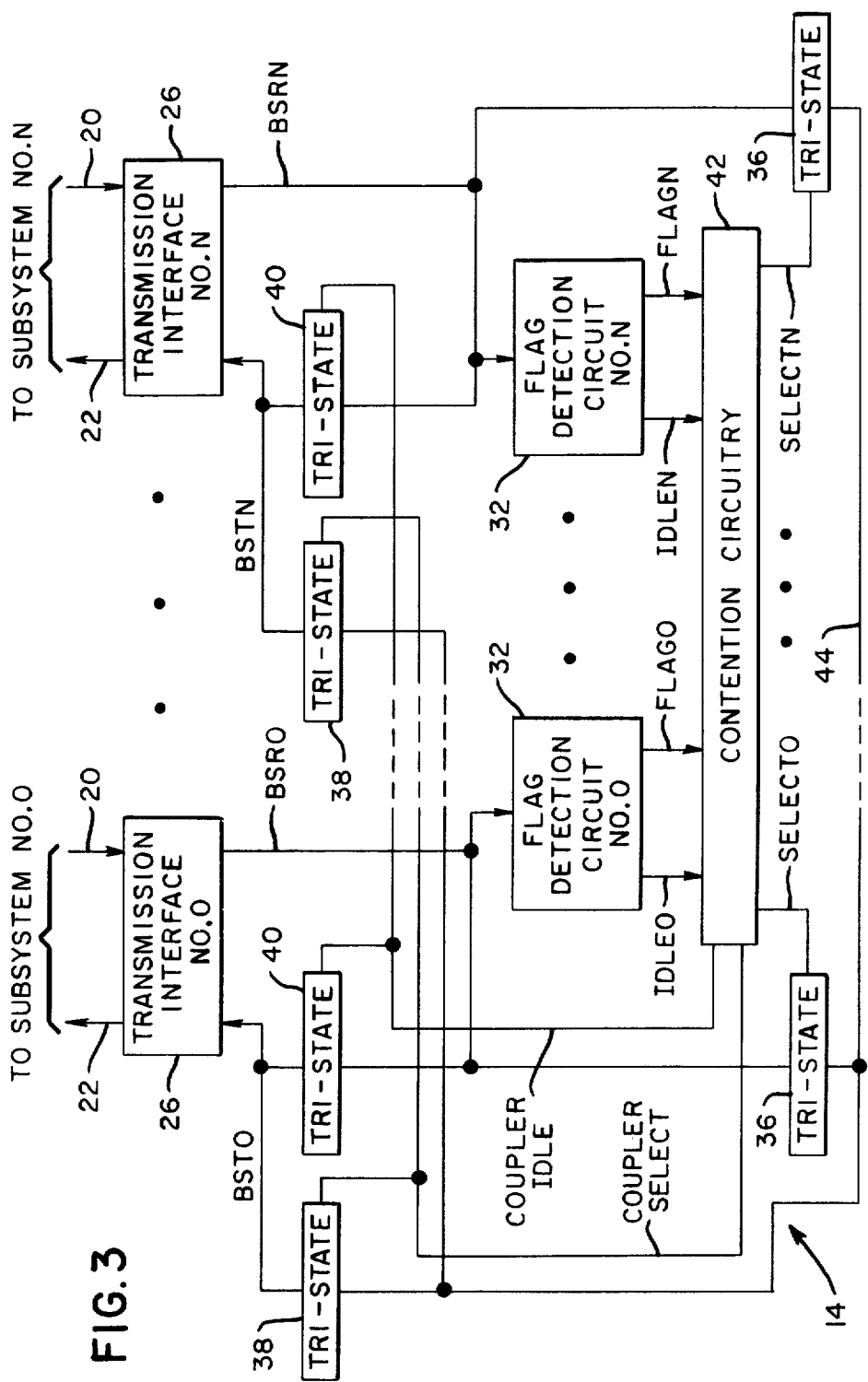
FIG. 3 is a detailed block diagram of the star coupler shown in FIG. 1.

The star coupler 14 is illustrated in greater detail in FIG. 3, where it can be seen that there is associated with each subsystem 12 and each pair of transmission lines 20 and 22, a transmission interface 26, a flag detection circuit 32, and gate means in the form of first, second and third tri-state devices or gates 36, 38 and 40, respectively. The star coupler 14 further includes contention circuitry 42 for resolving contention among the subsystems 12 for use of the star coupler. The contention circuitry 42 receives signals from each of the flag detection circuits 32 and, in turn, provides signals in order to control the tri-state devices 36, 38 and 40. Each transmission interface 26 and flag detection circuit 32 is numbered from "0" through "N," to show its association with one of the subsystems 12.

Each transmission interface 26 receives a serial signal from its associated subsystem 12 by way of transmission line 20 and, in turn, provides at its output the received serial signal (BSR0-BSRN) to its associated flag detection circuit 32. Each flag detection circuit 32 detects the existence of the beginning flag bits in the received message and, if such flag bits are detected, flag signals (FLAG0-FLAGN) are provided to the contention circuitry 42. If, on the other hand, each flag detection circuit 32 receives a series of "1's" from its transmission interface 26, indicating no message and an idle condition, then idle signals (IDLE0-IDLEN) are provided to the contention circuitry 42. In the presently preferred embodiment of the invention, each of the flag signals is at a "1" only when flag bits are received at its respective flag detection circuit 32, and each of the idle signals is at a "1" only when a stream of "1's" is received at its respective flag detection circuit.

As described earlier, the contention circuitry 42 resolves contention among each of the subsystems 12 when use of the star coupler 14 is sought for passing messages. The contention circuitry 42 receives the flag and idle signals from all of the flag detection circuits 32 and provides a group of selection signals (SELECT-0-SELECTN) that select one of the subsystems 12 which is to have its message passed through the star coupler 14. As will be more fully described later with reference to FIG. 7, the contention circuitry 42 will normally resolve contention in favor of the subsystem that first generates beginning flag bits. If two subsystems begin to generate flag bits during the same clock cycle, then the contention circuitry will resolve contention in favor of one of the subsystems 12 in accordance with a predetermined order of priority "programmed" into or established by the contention circuitry.

Still referring to FIG. 3, the contention circuitry 42 also provides a signal COUPLER SELECT that indicates when one of the subsystems has been given use of the star coupler, and a signal COUPLER IDLE that indicates when none of the subsystems has been given use of the star coupler, i.e., that all of the subsystems are in an idle condition. Each tri-state device 36 receives at its data input one of the signals BSR0-BSRN from the associated transmission interface 26 and is controlled by one of the SELECT0 through SELECTN signals, so that when one of the subsystems has been selected by the contention circuitry 42, the signals from that subsystem are passed to a common line 44 that leads to the data input of each tri-state device 38. Each tri-state device 38 is controlled by the COUPLER SELECT signal in order to pass the signal from the line 44 to each transmission interface 26 as the serial signal to be transmitted (BST0-BSTN) when a subsystem has been selected. The message from the selected subsystem is thereby transmitted along each second transmission line 22 to every subsystem. Of course, when one of the subsystems has its message passed by the star coupler, each of the signals BST0-BSTN is that message.

Each tri-state device 40 is controlled by the COUPLER IDLE signal so that when all of the subsystems are idle and are generating pulses representing a series of "1's," that series of "1's" from each subsystem is passed from the transmission interface 26 through the tri-state device 40, and then back through the transmission interface 26 and to the same subsystem. As mentioned earlier, this passing of "1's" back to each subsystem avoids problems arising from noise or other spurious signals that may be generated along the transmission lines 20 and 22.

FIGS. 4, 5, 6, and 7 are detailed circuit diagrams showing the circuit components within the transmission interface 26, the flag detection circuit 32, and the contention circuitry 42.

Figure 4:
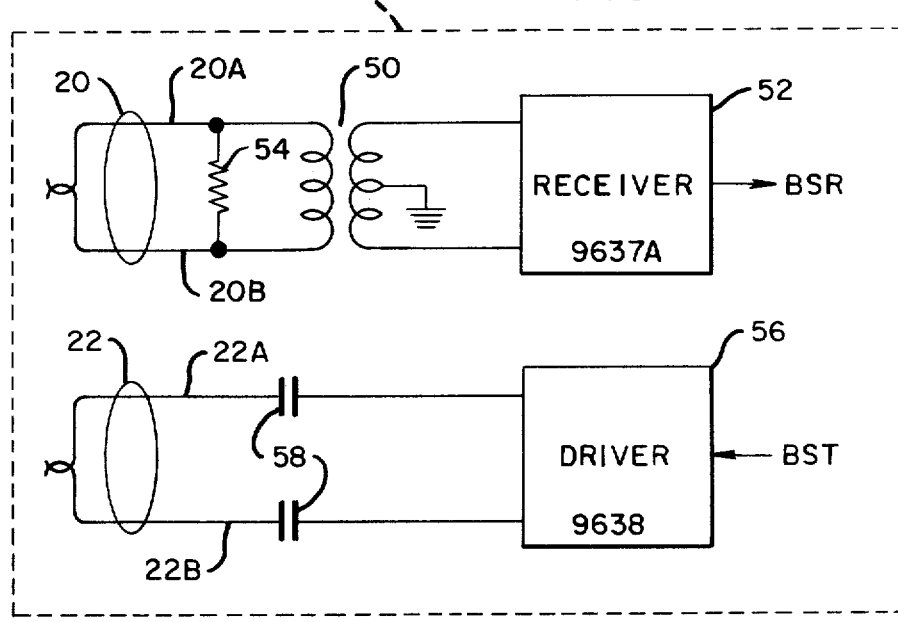
FIG. 4 is a detailed block diagram illustrating the circuit components within each transmission interface of the star coupler shown in FIG. 3.

Turning to FIG. 4, there is shown the circuitry within each transmission interface 26. As can be seen, transmission line 20 coming into the interface 26 is in the form of a twisted pair of conductors 20A and 20B, and is connected by way of a transformer 50 to a receiver 52. A resistor 54 is connected across the twisted pair of conductors 20A and 20B in order to match the impedances on each side of the transformer 50. The transformer 50 conditions the signals received from the twisted pair of conductors 20A and 20B and isolates the twisted pair of conductors from the receiver 52. The receiver 52 is a conventional differential receiver, such as circuit No. 9637A, available from Texas Instruments Incorporated, Dallas, Tex.

The output of the receiver 52 is the received signal (designated in general form as BSR in FIG. 4) provided to the flag detection circuits 32 and to the data inputs of the tri-state devices 36 and 40 in FIG. 3.

Also seen in FIG. 4 is a driver 56 that receives the signals from the outputs of the tri-state devices 38 and 40 as the signal to be transmitted (designated in general form as BST). The driver 56 provides that signal to the transmission line 22. Transmission line 22 is in the form of a twisted pair of conductors 22A and 22B, and each of the conductors has a capacitor 58 for isolating the driver from transmission line 22. The driver 56 may be a conventional differential driver, such as circuit No. 9638, available from Texas Instruments.

While the transmission lines 20 and 22 are shown as twisted pairs of conductors, it should be appreciated that other transmission mediums, such as coaxial cables or optical fibers, could be used within the scope of the present invention. Of course, if optical fibers are used, suitable optical sources and detectors would be required in each transmission interface 26.

Figure 5:
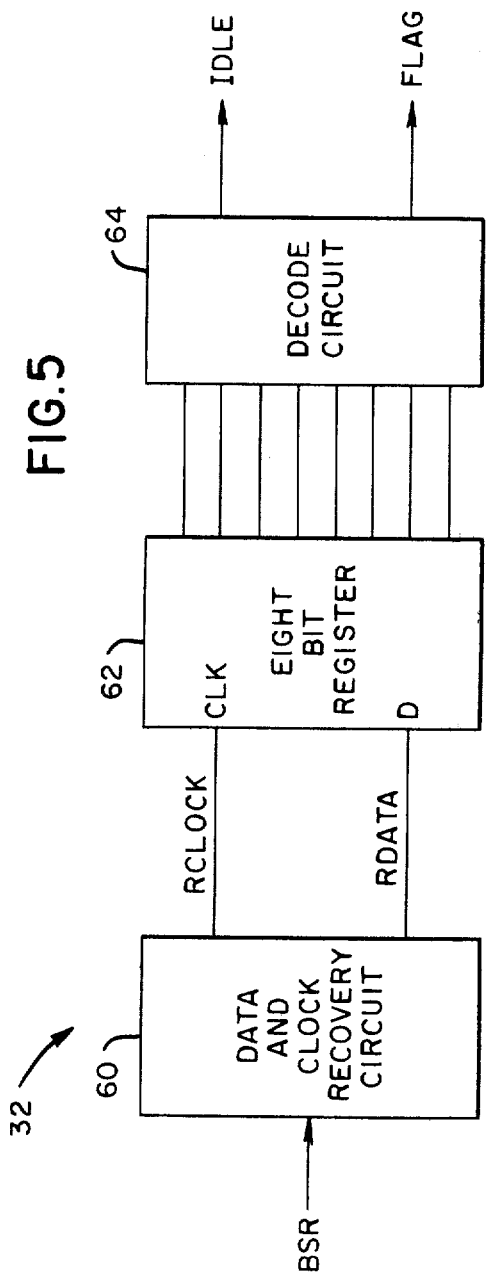
FIG. 5 is a block diagram illustrating the major circuit components within each flag detection circuit of the star coupler shown in FIG. 3.

Referring to FIG. 5, there is shown in simplified block form the major circuit components within each flag detection circuit 32. As can be seen, the flag detection circuit 32 includes a data and clock recovery circuit 60 for receiving the received signal (designated in general form as BSR) from one of the transmission interfaces 26, an eight-bit register 62 for receiving the recovered clock (RCLOCK) and the recovered serial data (RDATA) signals from the circuit 60, and a decode circuit 64 for receiving, in parallel, the eight bits of data stored in the register 62. The decode circuit 64 of each flag detection circuit 32 provides one of the idle signals (designated in general form as IDLE) having a value of "1" only when the eight bits stored in the register 62 are all "1's" and indicating that the subsystem with which the flat detection circuit is associated is in an idle condition. The decode circuit 64 also provides one of the flag signals (designated in general form as FLAG) having a value of "1" only when the eight bits stored in the register 62 are the flag bits of a message, indicating a message is about to be received from the associated subsystem.

Figure 6:
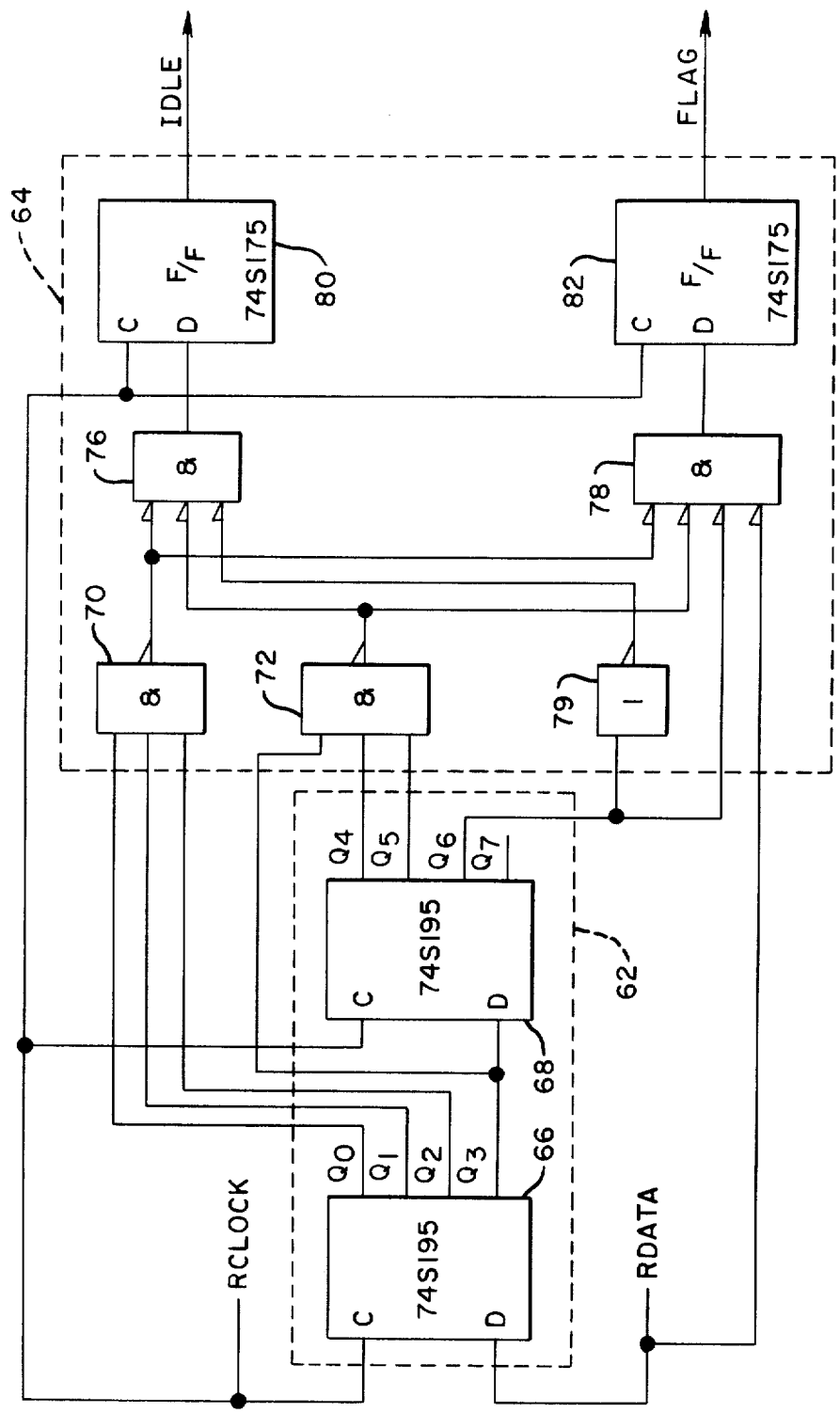
FIG. 6 is a detailed block diagram of the register and decode circuit of the flag detection circuit shown in FIG. 5.

In FIG. 6, there is shown in greater detail the circuitry within the register 62 and decode circuit 64. Not shown in FIG. 6 is the data and clock recovery circuit 60, since this circuit could be implemented by any one of many circuits now known in the art. The specific construction of the data and clock recovery circuit 60 will depend on the coding technique used in transmitting the signals over transmission line 20 and 22. For example, if a double frequency code is used, a suitable data and clock recovery circuit could be of the type shown in detail in U.S. application Ser. No. 98,019, filed Nov. 26, 1979, by Venu Chari, and assigned to the same assignee as the present application.

The eight-bit register 62 is shown in FIG. 6 as comprised of a cascaded pair of four-bit registers 66 and 68. Each of the registers 66 and 68 may be implemented by circuit No. 74S195, available from Texas Instruments, and is clocked by the recovered clock signal RCLOCK. The bits in the recovered data signal RDATA are provided to the data input D of the register 66 and are shifted through and stored in the cascaded registers 66 and 68. Three data bits $Q_0$-$Q_2$ at the output of register 66 are provided to a NAND gate 70, and the data bit $Q_3$ from register 66 and two data bits $Q_4$ and $Q_5$ from register 68 are provided to a NAND gate 72. The output of NAND gates 70 and 72 are provided to an AND gate 76, along with the data bit $Q_6$ from register 68 by way of an inverter 79. The outputs of NAND gates 70 and 72 are also provided to an AND gate 78, along with the data bit $Q_6$ directly from register 68 and the current bit in the recovered data (RDATA) signal.

The output of AND gate 76 is provided to a D-type flip-flop 80 and the output of AND gate 78 is provided to a D-type flip-flop 82. Flip-flops 80 and 82 are clocked by the recovered clock signal RCLOCK and provide at their respective outputs the IDLE and FLAG signals.

In the operation of the circuitry shown in FIG. 6, it should be apparent that the registers 66 and 68 only provide seven bits to be decoded by the decode circuit 64, rather than eight bits as previously represented in simplified form in FIG. 5. The eighth bit, $Q_7$, in register 68 is not used and, instead, the current bit of the recovered data (RDATA) signal is provided along with the bits $Q_0$–$Q_6$ to the decode circuit 64. This permits the decode circuit 64 to decode each eight bits of the recovered data as the eighth bit is generated by the data and clock recovery circuit 60, rather than taking the time to shift the eighth bit into the register 66.

When a series of "1's" are received and recovered by the data and clock recovery circuit 60 (FIG. 5), indicating that the associated subsystem is idle, the registers 66 and 68 in FIG. 6 store "1's" and all of the inputs to the NAND gates 70 and 72 (FIG. 6) are at "1." The output of the NAND gates 70 and 72 and inverter 79 will be at "0" and, accordingly, the output of AND gate 76 goes to a "1" and the output of AND gate 78 goes to a "0." The resulting IDLE signal at the output of flip-flop 80 goes to a "1," indicating the idle condition of the associated subsystem. At the same time, the resulting FLAG signal at the output of flip-flop 82 goes to a "0," indicating, of course, no flag bits received from the subsystem.

When flag bits are recovered and provided by the data clock and recovery circuit 60, the bits $Q_0$–$Q_5$ at the output of registers 66 and 68 are at a "1" and the bit $O_6$ at the output of register 68 and the current bit of RDATA are at a "0." As a result, the output of NAND gate 70 is at a "0," the output of NAND gate 72 is at a "0," the output of inverter 79 is at a "1," and the output of AND gate 76 is at a "0," causing the IDLE signal at the output of flip-flop 80 to go to a "0." Furthermore, the output of AND gate 78 goes to a "1" and, as a result, the FLAG signal at the output of flip-flop 82 goes to "1," indicating the receipt of flag bits by the flag detection circuit.

When the eight bits decoded by the decode circuit 64 are neither "1's" (representing an idle condition) nor flag bits, both the IDLE signal at the output of flip-flop 80 and the FLAG signal at the output of flip-flop 82 are at a "0." Such a condition, as will become apparent, does not affect the star coupler 14.

In FIG. 7 there is shown in detail the circuit components within the contention circuitry 42 of the star coupler 14. It will be assumed for purposes of the present description that, because of the use of commercially available components, there are only eight subsystems coupled to the star coupler and, accordingly, there are only eight flag signals (FLAG0–FLAG7) and eight idle signals (IDLE0–IDLE7) delivered by the flag detection circuits 32 to the contention circuitry 42. However, as will be illustrated later and described with reference to FIGS. 9 and 10, the star coupler 14 may easily be expanded to include more than eight subsystems in accordance with the present invention, still using commercially available components.

As seen in FIG. 7, each of the flag signals FLAG0 through FLAG7 is provided to one of eight D-type flip-flops 90. Flip-flops 90 are clocked by a clock signal INCLK, which will be described in greater detail later. The flag signals are clocked into and appear at the output of the flip-flops 90, in inverted form as $\overline{FLAGL0}$–$\overline{FLAGL7}$, during each cycle of the clock signal INCLK, and are provided to the eight data inputs $D_0$–$D_7$ of a priority encode circuit 92. The priority encode circuit 92 may be a conventional circuit, such as circuit No. 74LS148, available from Texas Instruments. The flip-flops 90 assure that the priority encode circuit 92 is provided with the flag signals at its data inputs no more than once during each clock cycle of the system.

The address outputs $A_0$–$A_2$ of the priority encode circuit 92 provide address signals indicating one of the flag signals at its inputs and, in turn, one of the subsystems 12 that has generated beginning flag bits. In particular, the address signals at the outputs $A_0$–$A_2$ of the parity encode circuit 92 have values representing only one of the subsystems that has its flag signal provided (in inverted form) at one of the inputs $D_0$–$D_7$, in accordance with the following Table I:

TABLE I

| INVERTED FLAG SIGNALS AT INPUTS OF PRIORITY ENCODE CIRCUIT 92 | | | | | | | | SIGNALS AT ADDRESS OUTPUTS | | | SIGNAL AT EO OUTPUT (DMND) |
|---|---|---|---|---|---|---|---|---|---|---|---|
| $\overline{FLAGL0}$ AT $D_0$ | $\overline{FLAGL1}$ AT $D_1$ | $\overline{FLAGL2}$ AT $D_2$ | $\overline{FLAGL3}$ AT $D_3$ | $\overline{FLAGL4}$ AT $D_4$ | $\overline{FLAGL5}$ AT $D_5$ | $\overline{FLAGL6}$ AT $D_6$ | $\overline{FLAGL7}$ AT $D_7$ | $A_2$ | $A_1$ | $A_0$ | |
| 0 | X | X | X | X | X | X | X | 0 | 0 | 0 | 1 |
| 1 | 0 | X | X | X | X | X | X | 0 | 0 | 1 | 1 |
| 1 | 1 | 0 | X | X | X | X | X | 0 | 1 | 0 | 1 |
| 1 | 1 | 1 | 0 | X | X | X | X | 0 | 1 | 1 | 1 |
| 1 | 1 | 1 | 1 | 0 | X | X | X | 1 | 0 | 0 | 1 |
| 1 | 1 | 1 | 1 | 1 | 0 | X | X | 1 | 0 | 1 | 1 |
| 1 | 1 | 1 | 1 | 1 | 1 | 0 | X | 1 | 1 | 0 | 1 |
| 1 | 1 | 1 | 1 | 1 | 1 | 1 | 0 | 1 | 1 | 1 | 1 |
| 1 | 1 | 1 | 1 | 1 | 1 | 1 | 1 | 1 | 1 | 1 | 0 |

X = DON'T CARE

As can be seen in Table I, the priority encode circuit 92 is constructed so that Subsystem No. 0 associated with the inverted flag signal ($\overline{FLAGL0}$) at the $D_0$ input has the greatest priority, Subsystem No. 1 associated with the inverted flag signal ($\overline{FLAGL1}$) at the $D_1$ input has the second greatest priority, Subsystem No. 2 associated with the inverted flag signal (FLAGL2) at the $D_2$ input has the next greatest priority, and so forth. More particularly, if FLAG0 is at a "1" (and, consequently, FLAGL0 is at a "0"), Subsystem No. 0 is given priority (regardless of any other flag signals) and the address signals indicating Subsystem No. 0 ("000") appear at the address outputs of the priority encode circuit 92. If FLAG1 is at a "1" (and FLAGL1 is at a "0"), Subsystem No. 1 is given priority (unless FLAG0 is at a "1") and the address signals indicating System No. 1 ("001") appear at the address outputs of priority encode circuit 92. Similarly, each of the remaining higher numbered subsystems is given priority, unless the flag signal associated with a lower numbered subsystem is at a "1."

As can also be seen in FIG. 7 and in Table I, the priority encode circuit 92 generates at an EO output a signal DNND, which is at a "0" only if there are no flag signals at a "1," and thus no inverted flag signals at a "0" at the outputs of flip-flops 90.

The address signals at the address outputs $A_0-A_2$ of the priority encoder circuit 92 are provided to the address inputs of a decode circuit 94. The decode circuit 94 may be a conventional decoder, such as circuit No. 74SL138 available from Texas Instruments. The decode circuit 94 generates each of the selection signals mentioned earlier in reference to FIG. 3 and also shown in FIG. 7 as SELECT0–SELECT7. As mentioned earlier, the selection signals are provided to the tri-state devices 36 (FIG. 3) in order to pass the message from one of the subsystems through the star coupler back to all of the subsystems.

Finally, there is shown in FIG. 7 a set of tri-state devices 98 and a J-K flip-flop 100. Each of the tri-state devices 98 receives at a control input one of the selection signals SELECT0–SELECT7 from the output of the decode circuit 94. Each tri-state device 98 also receives at a data input the corresponding one of the IDLE0–IDLE7 signals from the flag detection circuits 32 (FIG. 3). The outputs of the tri-state devices 98 are provided to the K input of the J-K flip-flop 100, and the DNND signal from the priority encode circuit 92 is provided to the J input of the flip-flop 100. The flip-flop 100 provides at its inverted output the COUPLER SELECT signal that is delivered to each of the tri-state devices 38 in FIG. 3. The flip-flop 100 provides at its non-inverted output the COUPLER IDLE signal that is delivered to each of the tri-state devices 40 in FIG. 3.

It should, of course, be apparent from the foregoing description that the contention circuitry 42 in the star coupler 14 prevents two subsystems from both passing messages through the star coupler 14 simultaneously. If the beginning flag bits of a message from one subsystem are received by its associated flag detection circuit 32 before the flag bits of any other messages from other subsystems are received by their associated flag detection circuits 32, the flag signal associated with that subsystem is the only flag signal clocked into flip-flops 90. Only that subsystem generating the first message will have its message passed through the star coupler by one of the SELECT0–SELECT7 signals, to the exclusion of any of the other messages. Such other messages, if their flag bits begin after the flag bits of the first message, have their flag bits or message bits discarded, since only one tri-state device 36 is enabled by the SELECT0–SELECT7 signals and all the tri-state devices 40 are disabled by the COUPLER IDLE signal.

If, however, two or more subsystems should generate beginning flag bits that start during the same clock cycle of the system, then the priority encode circuit 92 selects the subsystem having the highest priority as determined by the order of priority of its inputs described earlier in reference to Table I. The order of priority, of course, can be changed or reprogrammed by changing the connection of the flag detection circuits 32 to the inputs $D_0-D_7$ of the priority encode circuit 92.

When one of the subsystems is selected by the priority encode circuit 92, the DMND signal at the EO output goes to a "1," causing the J-K flip-flop 100 to be set so that the COUPLER IDLE signal is at a "0" and the COUPLER SELECT signal is at a "1." The J-K outputs remain in this state until the subsystem that was selected goes to an idle condition. That is, the one of the selection signals SELECT1–SELECT7 associated with the selected subsystem enables its tri-state device 98, so that when the one of the idle signals IDLE0–IDLE7 associated with the subsystem goes to a "1," that "1" is passed through the tri-state device 98 to the K input of flip-flop 100, causing the flip-flop 100 to change states. At such time, the COUPLER IDLE signal goes to a "1" and the COUPLER SELECT signal goes to a "0."

The clock signal INCLK that clocks each of the flip-flops 90 and the clock signal FCLK that clocks the flip-flop 100 may be generated within the contention circuitry 42. For example, referring to FIG. 8, there could be provided within the contention circuitry 42 a clock generating circuit 104 that includes an oscillator 106 and an AND gate 108. The oscillator 106 may be a conventional oscillator, such as circuit No. K1110A, available from Motorola, Inc., Chicago, Ill. The oscillator 106 provides at its output the clock signal FCLK at an uninterrupted frequency selected to be approximately the same as the frequency of the clock signal used to transmit the messages at each subsystem and the recovered clock signal RCLOCK recovered by the data and clock recovery circuit 60 in FIG. 5. The AND gate 108 receives the FCLK signal as well as the COUPLER SELECT signal from flip-flop 100 (FIG. 7), and provides the INCLK signal at its output.

As should be apparent, the INCLK signal clocks the flag signals FLAG0 through FLAG7 into flip-flops 90 only when all of the subsystems are idle and the COUPLER IDLE signal is at a "1." Once one of the subsystems has been selected by the priority encode circuit 92 and one of the SELECT0–SELECT7 signals, COUPLER IDLE goes to a "0" and the INCLK signal ceases. No other flag signals are clocked into the flip-flops 90 until the selected subsystem ends its message and goes back to an idle condition.

Figure 9:
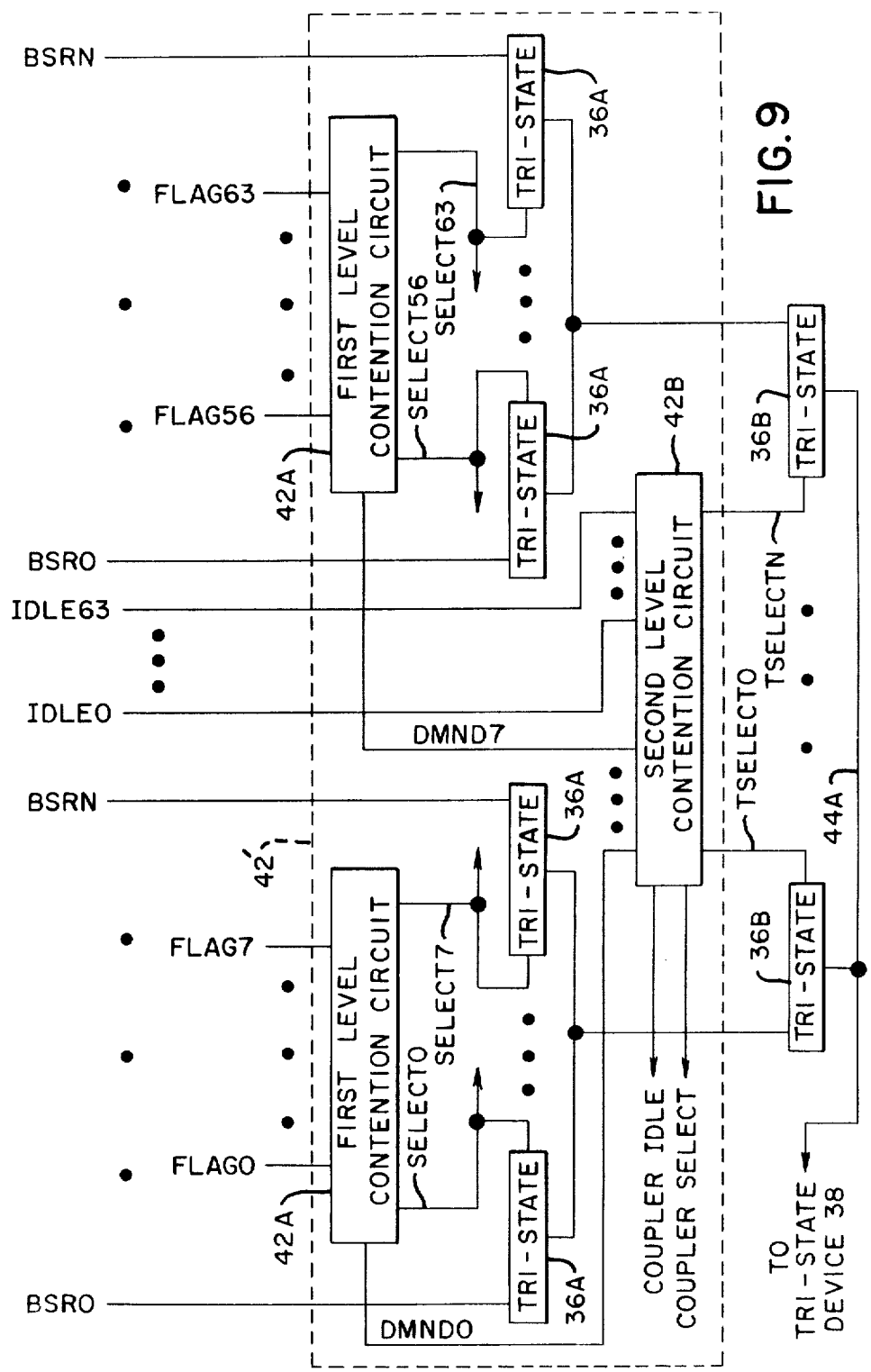
FIG. 9 is a block diagram illustrating an expanded star coupler having first level contention circuits and a second level contention circuit.

In FIG. 9 there is shown contention circuitry 42' which permits the expansion of the star coupler 14, in order for the star coupler to link a larger number of subsystems while still employing the commercially available components used in the contention circuitry 42 shown in FIG. 7.

In particular, the expanded contention circuitry 42' in FIG. 9 includes a plurality of first level contention circuits 42A and a second level contention circuit 42B. Each first level contention circuit 42A receives up to eight flag and idle signals. The second level contention circuit 42B can be connected to up to eight first level contention circuits, so that a total of 64 subsystems may be linked by the star coupler when using the expanded contention circuitry 42'.

Each of the first level contention circuits 42A can be constructed generally in the same manner as the contention circuitry 42 shown in FIG. 7 and, accordingly, will not be shown in any greater detail. Each first level contention 42A receives and provides the same signals as the contention circuitry 42, in FIG. 7, except that the DNND signal is not provided to the flip-flop 100 in order to generate the COUPLER SELECT and COUPLER IDLE signals. Rather, as shown in FIG. 9, the DMND signal from each of the first level contention circuits 42A (designated DMND0-DMND7) is provided directly to the second level contention circuit 42B, which provides the COUPLER SELECT and COUPLER IDLE signals.

Each of the first level contention circuits 42A is associated with a portion or group of the subsystems. Specifically, each of the circuits 42A is associated with eight of the sixty-four received serial data signals (BSR0-BSR63) from the transmission interfaces associated with each of the subsystems, is provided with eight of the sixty-four flag signals (FLAG0-FLAG63), and is provided with eight of the sixty-four idle signals (IDLE0-IDLE63). Sixty-four first level tri-state devices 36A each receive at their data inputs one of the received data signals (BSR0-BSR63) and each receive at their control inputs the corresponding one of sixty-four selection signals (SELECT0-SELECT63) provided at the outputs of the first level contention circuits 42A. The SELECT0-SELECT63 signals are also provided, as will be described later in reference to FIG. 10, to the second level contention circuit 42B. Each block of eight tri-state devices 36A associated with each of the first level contention circuits 42A passes no more than one of its eight received data signals.

The second level contention circuit 42B resolves contention among the first level contention circuits 42A, and generates eight second level selection signals TSELECT0-TSELECT7 that are each provided to one of eight second level tri-state devices 36B.

In operation, the first level contention circuits 42A each make a first level section by selecting one of the eight subsystems from which it receives associated flag and idle signals in the same manner that the contention circuitry 42 in FIG. 7 makes a selection among subsystems. The selected messages are each passed by the first level contention circuits 42A from the tri-state devices 36A to one of the tri-state devices 36B. The second level selection signals TSELECT0-TSELECT7 from the second level contention circuit 42B in turn select one of these messages, with the finally selected message passed from the output of one of the tri-state devices 36B to a common line 44A.

As should be apparent, the contention circuit 42' shown in FIG. 8 could be used in place of the contention circuitry 42 shown in FIG. 3. In such a case, the tri-state devices 36B in FIG. 8 would provide the same function as the tri-state devices 36 in FIG. 3, with the common line 44A connected to the tri-state devices 38 of FIG. 3, and with COUPLER SELECT and COUPLER IDLE signals from the second level contention circuit 42B provided to the tri-state devices 38 and 40, respectively, of FIG. 3.

In FIG. 10 there is shown the circuitry within the second level contention circuit 42B of FIG. 8. As can be seen, each of the signals DMND0 through DMND7 from the first level contention circuits 42A (FIG. 9) are provided to the data inputs of a priority encode circuit 110. Priority encode circuit 110 may be the same type of commercially available circuit as the priority encode circuit 92 in FIG 7, and the signals at the address outputs $A_0$–$A_2$ of the priority encode circuit 110 are provided to a decode circuit 112, which may be the same type of commercially available circuit as decode circuit 94 in FIG. 7. The decode circuit 112 provides at its outputs the signals TSELECT0–TSELECT7. The TDMND signal at the EO output of priority encode circuit 110 is provided to the J input of a J-K flip-flop 114. Each of sixty-four tri-state devices 116 receives at its data input one of the idle signals IDLE0–IDLE63 (FIG. 9) and at its control input the corresponding one of the selection signals SELECT0–SELECT63 from the first level contention circuit 42A (FIG. 9). The outputs of the tri-state devices 116 are provided to the K input of flip-flop 114. The inverted and non-inverted outputs of the flip-flop 114 provide the COUPLER SELECT and COUPLER IDLE signals, respectively.

Although the preferred embodiments of the present invention have been described, it will be understood that various changes may be made within the scope of the appended claims.

I claim:

1. A data processing system, comprising:

a plurality of subsystems, wherein each subsystem has an active condition when generating a message and an idle condition when no message is being generated, and wherein each subsystem generates a stream of repetitive binary bits when in its idle condition;

first transmission means associated with each subsystem for carrying messages from the associated subsystem when the associated subsystem is in its active condition, and for carrying said stream of repetitive binary signals from the associated subsystem when the associated subsystem is in its idle condition;

second transmission means associated with each subsystem for carrying messages to the associated subsystem, and for carrying said repetitive binary signals to the associated subsystem;

a star coupler for linking each first transmission means to every second transmission means so that a message from the first transmission means associated with one of said subsystems can be passed to the second transmission means associated with every subsystem, including contention circuitry in the star coupler for selecting one subsystem and controlling the star coupler so that only the messages from the first transmission means of the selected subsystem are passed through the star coupler to each second transmission means associated with every subsystem, and wherein said contention circuitry comprises means for controlling the star coupler to pass only the meassage received first in time at the star coupler, and for assigning a relative priority to each of said subsystems, for controlling the star coupler so that, if the beginning of more than one message is received simultaneously from more than one subsystem, only the message from the first transmission means associated with the subsystem having a higher assigned priority is passed to each second transmission means wherein said contention circuitry includes means for detecting the absence of a message on any first transmission means;

first gate means associated with each subsystem, each first gate means being connected to the first transmission means of its associated subsystem for receiving any message generated from its associated subsystem, and each first gate means being controlled by the contention circuitry to pass a message only when its associated subsystem has been selected by the contention circuitry;

second gate means associated with each subsystem, each second gate means being connected to every first gate means for receiving messages passed by each first gate means, each second gate means being connected to the second transmission means of its associated subsystem to pass a message thereto, each second gate means being controlled by the contention circuitry so that when one of the subsystems has been selected to have its message passed through the star coupler, each second gate means receives the message from the first gate means associated with the selected subsystem and passes the message to the second transmission means of its associated subsystem; and third gate means associated with each subsystem, each third gate means connected between the first transmission means and the second transmission means of its associated subsystem and controlled by the means for detecting the absence of a message so that when all of the subsystems are in an idle condition, the repetitive binary signals from each subsystem are passed through the third gate means back to the same subsystem.

2. In a data processing system having a plurality of subsystems, a first transmission line associated with each subsystem for carrying messages from that subsystem, a second transmission line associated with each subsystem for carrying messages to that subsystem, and a star coupler for operatively connecting any first transmission line to every second transmission line so that a message on one first transmission line from one of the subsystems is passed to every second transmission line and goes to all of the subsystems, where two or more subsystems may each simultaneously transmit a message to its associated first transmission line to be passed through the star coupler, the improvement for preventing the superimposition of a message from one subsystem upon a message from another subsystem at the star coupler and on each second transmission line, wherein each subsystem has an active condition in which it generates a message and an idle condition in which it generates repetitive binary bits, wherein each subsystem generates beginning flag bits preceeding each message, and wherein the star coupler comprises:

a flag detection circuit associated with each of the subsystems, each flag detection circuit connected for receiving the beginning flag bits and the repetitive binary bits from the associated subsystem, and providing a FLAG signal indicating when the beginning flag bits have been received and an IDLE signal indicating when the repetitive bits have been received;

contention means responsive to the beginning flag bits from the first transmission line associated with each of the subsystems for controlling the star coupler, the contention means selecting one subsystem for controlling the star coupler so that, at any given point in time, only one message from the first transmission line of a selected one of the subsystems is passed through the star coupler to every second transmission line going to all of the subsystems, wherein the contention means comprises:

a priority encode circuit connected for receiving the FLAG signal from each flag detection circuit and in response providing address signals representing only the selected one of the subsystems and a DMND signal indicating the absence of flag bits from any of the subsystems;

a decode circuit for receiving the address signals and in response providing a SELECT signal associated with each of the subsystems indicating whether each of the subsystems is the selected one of the subsystems;

flip-flop means connected for receiving the DMND signal and the IDLE signal associated with the selected one of the subsystems, for providing a COUPLER SELECT signal for indicating the active condition of the selected one of the subsystems and the subsequent idle condition of the selected one of the subsystems; and gate means associated to each first transmisson line and to each second transmission line, and controlled by each SELECT signal and the COUPLER SELECT signal in order to pass the message from the first transmission line associated with the selected one of the subsystems to the second transmission line associated with every one of the subsystems.

3. In a data processing system having a plurality of subsystems including at least two groups of subsystems, a first transmission line associated with each subsystem for carrying messages from that subsystem, a second transmission line associated with each subsystem for carrying messages to that subsystem, and a star coupler for operatively connecting any first transmission line to every second transmission line so that a message on one first transmission line from one of the subsystems is passed to every second transmission line and goes to all of the subsystems, where two or more subsystems may each simultaneously transmit a message to its associated first transmission line to be passed through the star coupler, the improvement for preventing the superimposition of a message from one subsystem upon a message from another subsystem at the star coupler and on each second transmission line, wherein each subsystem has an active condition in which it generates a message and an idle condition in which it generates repetitive binary bits, wherein each subsystem generates beginning flag bits preceeding each message, and wherein the star coupler comprises:

(1) a flag detection circuit associated with each of the subsystems, each flag detection circuit connected for receiving the beginning flag bits and the repetitive binary bits from the associated subsystem, for providing a FLAG signal indicating when the beginning flag bits have been received, and for providing an IDLE signal indicating when the repetitive bits have been received;

(2) a second level gate means;

(3) contention means responsive to the beginning flag bits from the first transmission line associated with each of the subsystems for controlling the star coupler, the contention means selecting one subsystem for controlling the star coupler so that, at any given point in time, only one message from the first transmission line of a selected one of the subsystems is passed through the star coupler to every second transmission line going to all of the subsystems, wherein the contention means comprises:

(3)(a) at least two first level contention circuits, with each first level contention circuit associated with one of the groups of subsystems, where each first level contention circuit comprises a priority encode circuit connected for receiving the FLAG signal from the flag detecton circuit associated with each of the subsystems in the associated group of subsystems, for generating a DMND signal indicating when one of the subsystems of the associated group of the subsystems is a first level selected subsystem, and for generating a SELECT signal for each subsystem of its group of the subsystems indicating whether each subsystem of the associated group of the subsystems is the first level selected subsystem;

(3)(b) a second level contention circuit connected for receiving the DMND signal and the SELECT signals from each first level contention circuit and further connected for receiving the IDLE signal from each flag detection circuit, where the second level contention circuit includes a priority encode circuit for generating a TSELECT signal associated with each first level contention circuit for indicating whether the first level selected subsystem and its associated group of the subsystems is to have its message passed as the selected one of the subsystems, the second level gate means being controlled by the TSELECT signal; and (3)(c) first level gate means connected to each first transmission line and controlled by the SELECT signals from each first level contention circuit in order to pass the message from the first level selected subsystem in the group of subsystems associated with each first level contention circuit, the second level gate means being connected to receive and pass one of the messages of each first level selected subsystem from each first level gate means as message from the selected one of the subsystems.

4. In a data processing system having a plurality of subsystems, a first serial transmission line associated with each subsystem for carrying messages from that subsystem, a second serial transmission line associated with each subsystem for carrying messages to that subsystem, and a star coupler for operatively connecting each first transmission line to every second transmission line so that a message from one of the subsystems may be delivered to all of the subsystems, and wherein more than one subsystem may each simultaneously transmit a message to its associated first transmission line, the improvement wherein each subsystem has an active condition in which it generates a message and an idle condition in which it generates repetitive bits, wherein each subsystem generates beginning flag bits preceding each message, and wherein the star coupler comprises:

a flag detection circuit associated with each subsystem, including a register connected for storing bits received from the first transmission line of the subsystem and a decode circuit connected for receiving the stored bits and providing a FLAG signal when the beginning flag bits are received by the register and an IDLE signal when the repetitive bits are received by the register;

contention circuitry for controlling the star coupler so that at any given point in time only one message from the first transmission line associated with a selected one of the subsystems is passed through the star coupler to the second transmission lines associated with all of the subsystems, the contention circuitry comprising:

a priority encode circuit connected for receiving the FLAG signal from each flag detection circuit and in response providing address signals representing only the selected one of the subsystems, and providing a DMND signal indicating whether a subsystem has been selected, the priority encode circuit providing the address signals so that the selected one of the subsystems is the subsystem whose associated flag detection circuit is first in time to provide a FLAG signal to the priority encode circuit and, if the FLAG signals from two flag detection circuits are provided during the same clock cycle, is the subsystem with a higher predetermined relative priority established by the priority encode circuit;

a decode circuit connected for receiving the address signals from the priority encode circuit and in response providing a SELECT signal for each of the subsystems indicating whether each subsystem is the selected one of the subsystems; and flip-flop means connected to the priority encode circuit, the decode circuit and the flag detection circuit for being responsive to the DMND signal, the SELECT signals, and the IDLE signals, said flip-flop means for providing a COUPLER SELECT signal, the COUPLER SELECT signal indicating the active condition of the selected one of the subsystems, and for inverting the COUPLER SELECT signal to provide a COUPLER IDLE signal;

first gate means associated with each of the subsystems, connected for receiving one of the SELECT signals, and connected to one of the first transmission lines for receiving the message from one of the subsystems, and for passing the message if that subsystem is the selected one of the subsystems;

second gate means associated with each of the subsystems, each second gate means connected to every first gate means and connected to the second transmission line of its associated subsystem, for receiving the COUPLER SELECT signal and passing the message from the selected one of the subsystems to each second transmission line; and third gate means associated with each subsystem and connected between the first transmission line and the second transmission line of its associated subsystem, each third gate means for receiving the COUPLER IDLE signal and passing the repetitive bits between its connected first and second transmission lines when all of the subsystems are in the idle condition.

* * * * *